United States Patent
Dubov

(10) Patent No.: US 10,969,765 B2
(45) Date of Patent: Apr. 6, 2021

(54) CUSTOM ASSEMBLY OF 3D PRINTED BUILDING MODULES

(71) Applicant: Mighty Buildings, Inc., San Francisco, CA (US)

(72) Inventor: Aleksei Dubov, Moscow (RU)

(73) Assignee: Mighty Buildings, Inc., San Francisco, CA (US)

( * ) Notice: Subject to any disclaimer, the term of this patent is extended or adjusted under 35 U.S.C. 154(b) by 0 days.

(21) Appl. No.: 16/811,182

(22) Filed: Mar. 6, 2020

(65) Prior Publication Data

US 2020/0387138 A1 Dec. 10, 2020

Related U.S. Application Data

(63) Continuation-in-part of application No. 16/431,512, filed on Jun. 4, 2019, now Pat. No. 10,817,155.

(51) Int. Cl.
| | |
|---|---|
| *G06F 3/048* | (2013.01) |
| *G05B 19/4099* | (2006.01) |
| *B33Y 50/02* | (2015.01) |
| *G06F 3/0481* | (2013.01) |
| *G06F 30/13* | (2020.01) |
| *B29C 64/393* | (2017.01) |

(52) U.S. Cl.
CPC ........ *G05B 19/4099* (2013.01); *B29C 64/393* (2017.08); *B33Y 50/02* (2014.12); *G06F 3/04815* (2013.01); *G06F 30/13* (2020.01); *G05B 2219/49007* (2013.01)

(58) Field of Classification Search
None
See application file for complete search history.

(56) References Cited

U.S. PATENT DOCUMENTS

| | | |
|---|---|---|
| 2009/0099954 A1 | 4/2009 | Kilby |
| 2010/0198563 A1* | 8/2010 | Plewe .................. G06F 30/392 703/1 |
| 2010/0211512 A1 | 8/2010 | Detwiler et al. |
| 2011/0055091 A1 | 3/2011 | Budlong |
| 2011/0087350 A1 | 4/2011 | Fogel et al. |
| 2012/0290492 A1 | 11/2012 | Zabala Rodriguez |
| 2014/0278280 A1 | 9/2014 | Pardo-Fernandez |
| 2016/0110824 A1 | 4/2016 | Zabala Rodriguez |
| 2019/0009428 A1* | 1/2019 | Dienemann ............ B33Y 70/00 |

FOREIGN PATENT DOCUMENTS

JP 2003-150655 A 5/2003

* cited by examiner

*Primary Examiner* — William C Trapanese
(74) *Attorney, Agent, or Firm* — Cognition IP, P.C.; Edward Steakley

(57) ABSTRACT

Methods, systems, and apparatus, including computer programs encoded on computer storage media, for determining a suitable building layout for a property. One of the operations is performed by optionally, receiving building module parameters for section of qualifying building modules. displaying, via a user interface, a graphical representation of two or more building modules. A user may customize a building layout from the two or more building modules. The system displays an assembled building layout including two or more building modules. The system receives a confirmation of the assembled building layout for 3D printing. Based on the assembled building layout, instructions are generated and transmitted to one or more 3D printers to manufacture one or more building structures based on the selected building layout.

27 Claims, 9 Drawing Sheets

CUSTOM ASSEMBLY OF 3D PRINTED BUILDING MODULES

CROSS-REFERENCE TO RELATED APPLICATION

This application is a Continuation-in-Part of, and claims the benefit of U.S. patent application Ser. No. 16/431,512, filed Jun. 4, 2019, which is hereby incorporated by reference it its entirety.

BACKGROUND

Traditional building planning and building construction processes are often complicated and inefficient. Building planning may require hiring an architect to design a building, creating a floor plan, hiring a lead contractor or multiple contractors to construct the building, obtaining permits from local agencies to begin the construction, and incurring inspections of the structure at various times during construction. As to building a structure often a foundation must first be poured and then framing, plumbing, electrical systems and drywall must be constructed or installed. Construction of a new structure on a property often takes many months to complete and requires multiple workers and inspections as the construction proceeds.

SUMMARY

Described herein is an exemplary system for determining suitable building layouts for a property and generating instructions for an automated production line with a 3D printing process to produce the structure for a selected building layout. The exemplary system provides for user customization and selection of building modules that form a final building layout. The building modules are 3D printed and assembled to form a complete building structure. The 3D printed structure may be printed using Large Scale Additive Manufacturing methods, and then the printed structure may go through post-processing steps like pouring foam for insulation, finishing exterior and interior surfaces and be installed on the property.

In general, one innovative aspect of the subject described in this specification can be embodied in systems, computer readable media, and methods that include operations for determining a suitable building layout for a property. One of the operations is performed by receiving, via a user interface, a selection of a property, and accessing zoning information based on the property. A building envelope is determined and displayed via the user interface. A location for the placement of a suitable building footprint within the building envelope is determined and the building footprint displayed within the building envelope. A building layout is determined that fits within the building envelope. Based on a selected building layout, instructions are generated and transmitted to an automated production line comprising a 3D printing process to produce one or more building structures based on the selected building layout.

In general, another innovative aspect of the subject described in this specification can be embodied in systems, computer readable media, and methods that include operations for customizing a building layout for 3D printing of the constituent building modules that form an assembled building layout. A user interface displays a graphical representation of two or more building modules. A building module represents a building structure that may be 3D printed and assembled together with another 3D printed building structure of another building module. A building layout may be customized by the selection of two or more building modules thereby creating an assembled building layout. The assembled building layout includes those building modules that are of a configuration that may be physically assembled together after the respective building modules have been 3D printed. A user interface displays a graphical representation of the assembled building layout including the selected two or more building modules. The user interface receives a confirmation of the assembled building layout for production via an automated production line comprising a 3D printing system.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
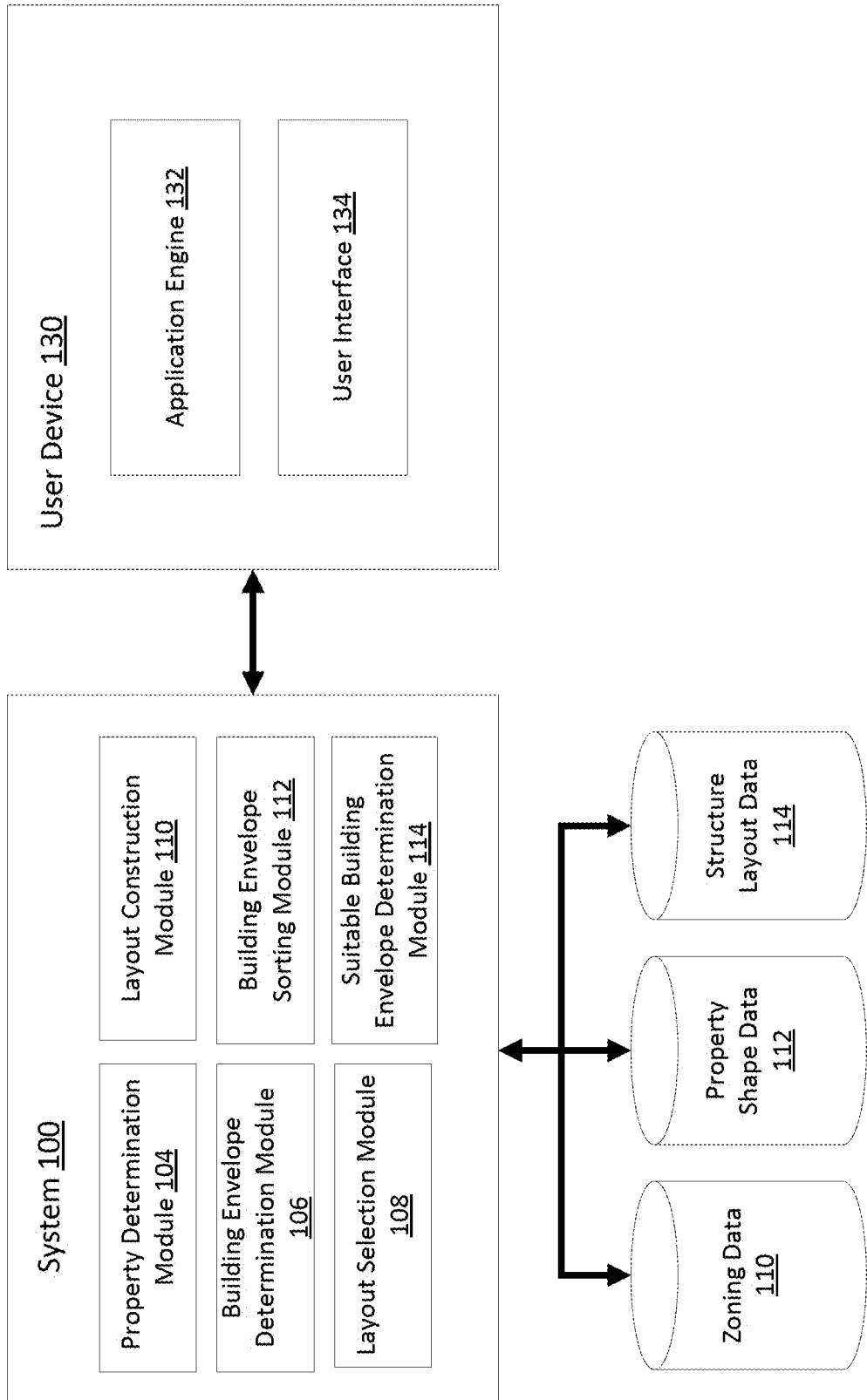
FIG. 1 illustrates a block diagram of an example system utilized in performing determination of a suitable building layout for a property.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates a block diagram of an example system 100 utilized in performing determination of a suitable building layout for a property. The system 100 includes a property determination module 104, a building envelope determination module 106, a building layout selection module 108, a suitable layout construction module 110, a building envelope sorting module 112, and a suitable building envelope determination module 114, and an application engine 132 that can receive input and selections from a user, and can generate user interface data describing property boundaries, property footprints, building envelopes, property building layouts and building modules. The system 100 can generate interactive user interfaces 134 (e.g., web pages to be rendered by a user device) for presentation on a user device 130. A user of the user device 130 can provide information (e.g., user input) associated with a particular property via the user interface 134.

The system 100 includes one or more electronic data stores that may be locally or remotely accessed. These data stores (e.g., databases), include, but are not limited to, zoning data 110 which includes zoning data related to a property identifier, property shape data 112 which includes property shape data related to a property identifier, and structure building layout data 114 which includes structure data related to building layouts and/or building modules. While the data stores 110, 112 and 114 are displayed separately, the data and information maintained in a data store may be combined together or further separated in a manner the promotes retrieval and storage efficiency and/or data security.

Figure 2:
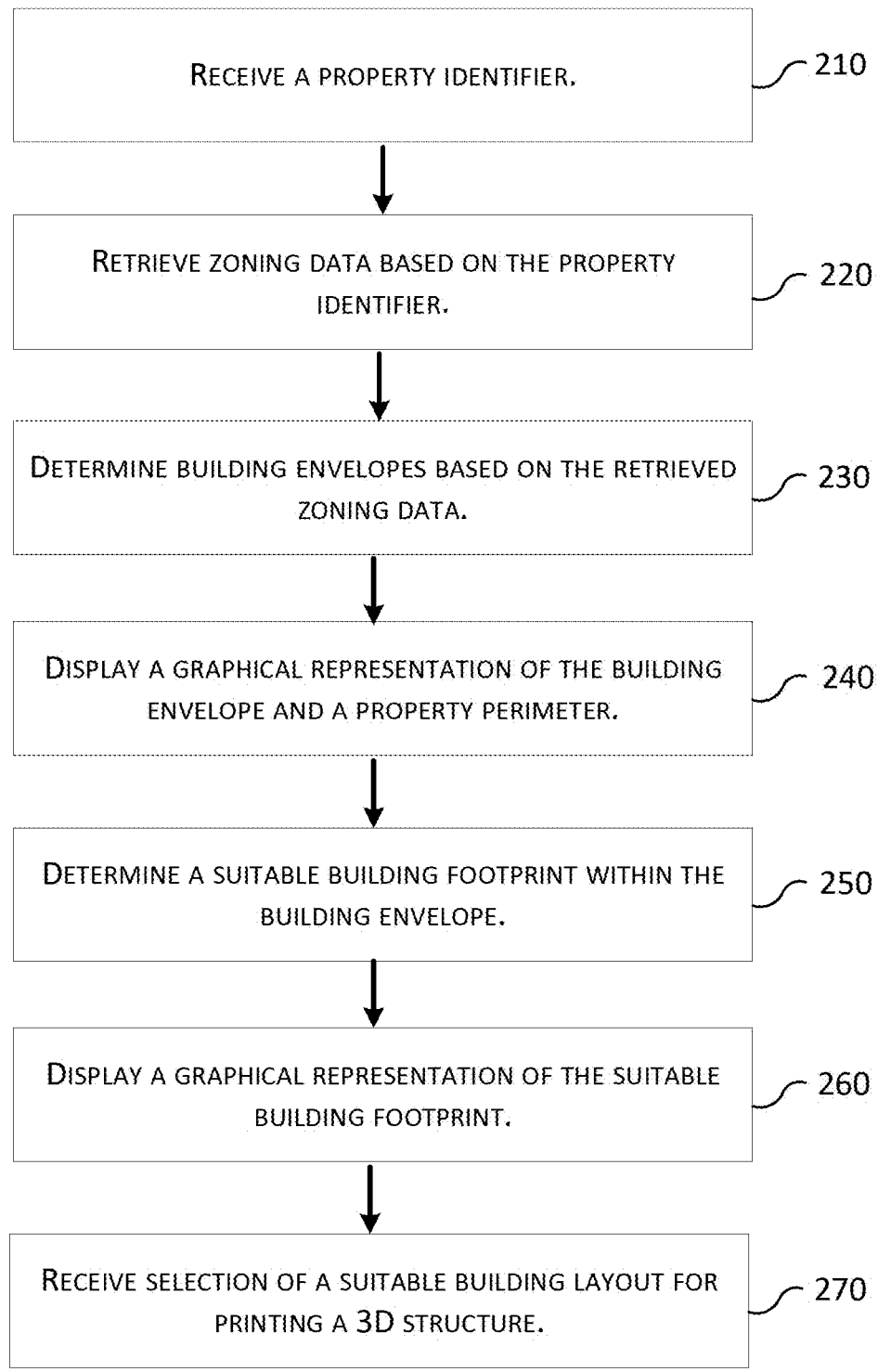
FIG. 2 illustrates a flowchart of an example process for determining a suitable building layout for a property.

Now referring to FIG. 2, the figure illustrates a block diagram of an example process for determining a suitable building layout for a property. Via the property determination module 104 the system 100 obtains property parcel information based on a received property identifier 210 via the user interface 134. In response to receiving the property identifier, the system 100 retrieves zoning data based on the property identifier 220. Then based on the retrieved zoning data, via the building envelope determination module 106, the system 100 determines or generates building envelopes based on the zoning data 230. The system 100 then displays via user interface 134 a graphic representation of building envelopes along with a perimeter of the property and the perimeters of other building footprints 240. The system 100 then determines a suitable building footprint within the building envelope 250, and the displays, via user interface 134, a graphical representation of the suitable building footprint 260. The system 100 then receives a selection of a suitable building layout for printing a 3D structure based on the selected suitable building layout 270.

The property identifier may be any one of an address of the property (e.g., 123 Anywhere St., San Francisco, Calif.), a geo-spatial location such as a GPS or GNSS coordinate, a latitude or longitude coordinate, a specific identifier referencing a particular property such as an assessor's parcel number (APN) or a lot number, and/or any other suitable descriptor that identifies a particular property parcel. In one example, a user may enter an address of the property for which the user desires to determine a suitable building layout for the property. The system 100 may use the property address as the property identifier and then in response to receiving the property address, the system 100 retrieves zoning data from a data store 110 related to the property identifier 220.

In another example, the system 100 may display, via the graphical user interface 134, a map depicting one or more property parcels. The system 100 may receive a user selection of one or more of the property parcels via the user interface 134. In response to the selection, the system 100 obtains zoning data from a data store 110 related to the user's selected property parcel 220.

The data store 110 may be a local or remote database that includes zoning data related to the property identifier. Moreover, the data store may be accessed via an application program interface (API) for instance where the system 100 may access data via a cloud-based system or service, or an Internet-based data store. Additionally, the system 100 may access a local database or memory storage device directly and retrieve zoning data.

The zoning data 110 includes information and data that may be used to determine pre-existing building structures, property boundaries and other zoning requirements for building additional structures or enhancing pre-existing structures on a property. Exemplary zoning data may include, but is not limited to the following:

APN Number—is a unique number that is assigned to each tract of land in a county typically by the tax assessor. This value is typically indicated as alpha-numeric.

Address—is the street address of the tract of land. This value is typically indicated as alpha-numeric.

Current Use—is an allowed type of use for the tract, such as commercial, administrative, residential or industrial. This value is typically indicated as alpha-numeric.

Allowed Uses—is list of allowed uses such as accessory dwelling unit (ADU) and supplemental dwelling unit (SDU). This value is typically indicated as alpha-numeric.

Historical District—indicates whether the tract is in a designated historical district. This value is typically indicated with a Boolean value of Y or N.

Zoning—is the zone name, for example 'R-1', 'R-1-8', 'A1-1'.

Perimeter—perimeter of the lot.

Area Square Footage—square footage of the lot.

Free Space Square Footage—space not occupied by any registered structure on the lot.

Number of Footprints—indicates the total pre-existing number foots prints for the property. This number of footprints is typically indicated as a numerical integer value, such as 0, 1, 2, 3, etc.

Parameters of Every Footprint—a list of dots defining polygons for every footprint with location of the lot and its square footage and perimeter.

Maximum Floor Area—is the maximum square feet for a building structure. This maximum floor area is typically indicated as a numeric value in square feet.

Minimum Floor Area—is the minimum square feet for a building structure. This minimum floor area is typically indicated as a numeric value in square feet.

Minimum Front Setback—is the minimum distance between the edge of the front of the property line of the tract and where a structure may be added. This minimum distance is typically indicated as a numeric value in feet as a numerical integer value, such as 0, 1, 2, 3, etc. and/or fractional numbers.

Minimum Rear Setback—is the minimum distance between the edge of the rear of the property line of the tract and where a structure may be added. This minimum distance is typically indicated as a numeric value in feet.

Minimum Side Setback—is the minimum distance between the edge of a side of the property line of the tract and where a structure may be added. This minimum distance is typically indicated as a numeric value in feet.

Minimum 2nd Floor Front Setback—is the minimum distance between the edge of the front of the property line of the tract and where 2nd floor of new structure may be added. The minimum distance is typically indicated as a numeric value in feet.

Minimum 2nd Floor Side Setback—is the minimum distance between the edge of a side of the property line of the tract and where 2nd floor of new structure may be added. This minimum distance is typically indicated as a numeric value in feet.

Maximum Building Height—is the maximum height for a building structure on the tract and is typically designated in feet or meters. This minimum distance is typically indicated as a numeric value in feet.

Maximum Number of Floors—is the maximum number of floors for a building structure, and is typically designated as a numerical integer value, such as 1, 2, 3, 4, etc.

Allowed in Front Yard—indicates whether a new structure allowed to be built on the front yard of the tract. This value is typically indicated with a Boolean value of Y or N.

Required Number of Parking Spaces—is the required number of parking spaces for the property. This number of parking spaces is typically indicated as a numerical integer value, such as 0, 1, 2, 3, etc.

Figure 3A:
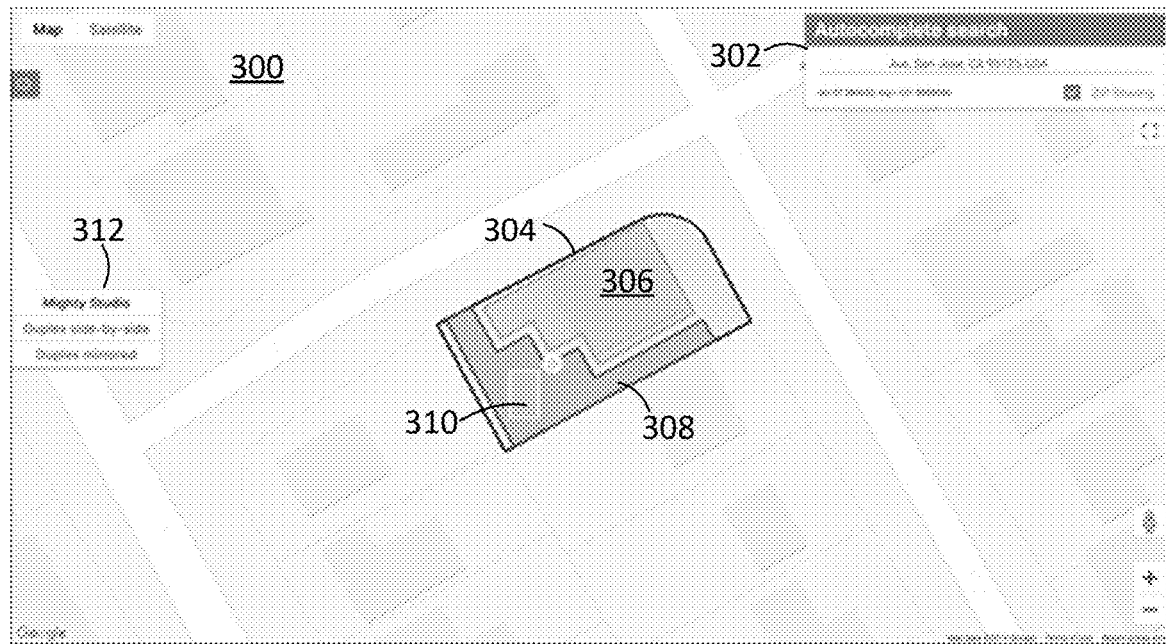
FIG. 3A illustrates an example user interface of the computer system.
Figure 3B:
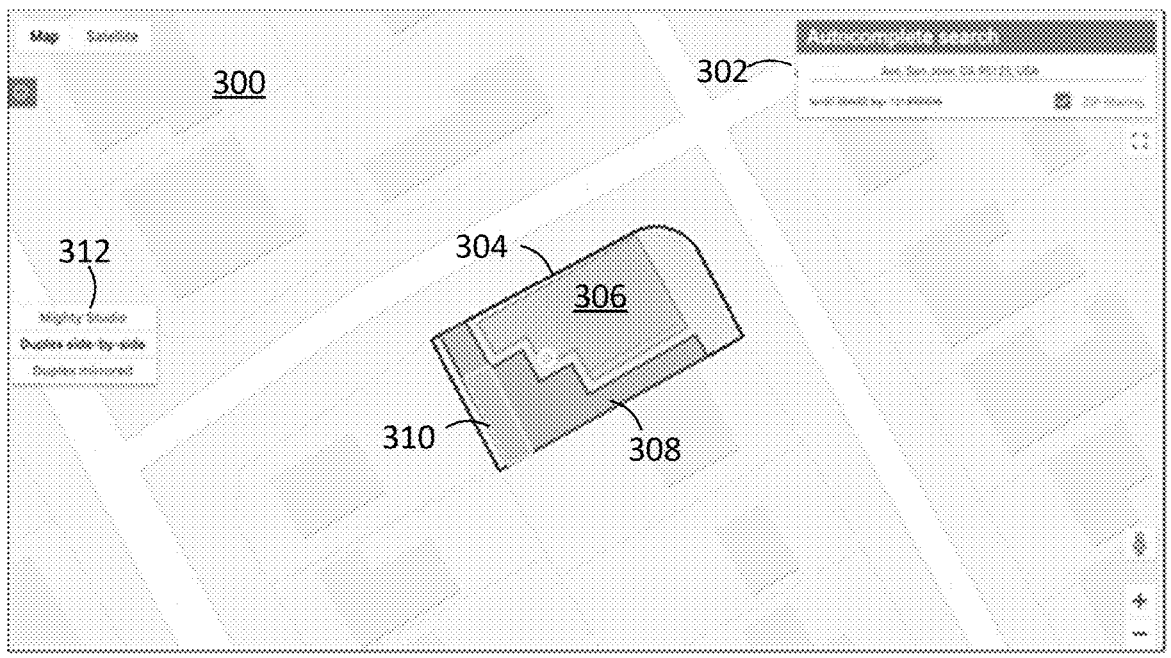
FIG. 3B illustrates an example user interface of the computer system.

Now referring to FIGS. 3A and 3B, an exemplary user interface 300 of system 100 is illustrated. The user interface 300 includes a user affordance 302 (e.g., an input text box) for entering a property identifier. The system 100 receives an input from a user designating a property identifier, such as an address into the user affordance 302. In response to receiving the property identifier, the system 300 retrieves from one or more data stores, shape data 112 (e.g., vector or raster data, geo-spatial coordinates, or other data that may be used to render a graphical shape) related to the property identifier.

Based on the retrieved zoning data and shape data 110, 112, via the building envelope determination module 106, the system 100 generates a graphical representation of the property boundary 304 (e.g., a polygonal boundary perimeter), pre-existing footprints of the property 306 (e.g., a polygonal footprint perimeter), and one or more building envelopes 308 (e.g., a polygonal building envelope perimeter). The system 100 determines from the zoning data whether any pre-existing footprints (e.g., structures or other property used spaced, such as a driveway) exist on the property. If the system 100 determines that a pre-existing footprint exists 306, then based on retrieved shape data 112, the system 100 generates a pre-existing footprint perimeter 306 depicting the perimeter for a respective pre-existing footprint.

In the example user interface 300, while only one pre-existing footprint perimeter 306 is depicted, in many instances, multiple footprints may pre-exist on the subject property. If such is the case, then the system 100 will generate multiple footprint perimeters, one for each of the pre-existing footprints and display, via the user interface 300, the pre-existing footprint perimeters 306. The system 100 may combine two or more pre-existing footprint perimeters into a larger perimeter if multiple pre-existing footprint perimeters are contiguous and/or adjacent to one another. In other words, multiple pre-existing footprint perimeters may be combined into a single larger polygonal shape, and graphically displayed, via the user interface 300, as such.

Based on the retrieved zoning data, via the building envelope determination module 106, the system 100 determines one or more building envelopes 308 for the available free space of the property on which a new structure may be added. In other words, the building envelope 308 represents the available free space of the property where a building structure may be added in compliance with zoning requirements as to the property. For example, the system 100 may calculate a building envelope 308 by evaluating the property's perimeter and excluding pre-existing footprints and minimum setbacks from each property line and pre-existing structures.

Note that in some instances, the property may not have associated zoning data (e.g., the property may be located in an unincorporated area), and in such a case, a building envelope would be unencumbered by typical zoning requirements (e.g., minimum setbacks).

After the system 100 determines the building envelope(s) 308, the system 100 displays the building envelope(s) 308 as one or more polygons placed within the property perimeter 304. Any number of determined building envelopes may be placed within the property perimeter.

The system 100 allows for various modes of selecting or automatically suggesting suitable building layouts for the property. A suitable building layout is a model representing a 3D printed structure that may be printed and installed on the property in an available building envelope. A suitable building layout is graphically represented in the user interface 300 by a suitable building footprint 310. The suitable building footprint is a proposed footprint of a new structure. A suitable building footprint corresponds to the size and the location on the property where the new 3D printed building structure is to be installed or placed.

In one embodiment, the system 100 predetermines a set of building layouts that would fit within the building envelope 308. For example, the system 100, via the layout selection module 108, displays, via the user interface 300, a list of suitable building layouts 312 that would fit within the predetermined building envelope 308. In this example, three different suitable building layouts (e.g., a Mighty Studio, Duplex side-by-side, and Duplex Mirrored) have been determined to fit within the building envelope 308. The user interface 300 may receive a user selection of one of the suitable building layouts from the list 312. In response to receipt of the selection, the system 100 displays a suitable building footprint 310 corresponding to the selected suitable building layout from the list 312. Each of the suitable building layouts have a predetermined size and overall square footage. The suitable building footprint 310 is scaled to the size of the selected suitable building layout in relation to the scale of the property and is displayed via the user interface 300 as such.

These predetermined building layouts correspond to suitable building footprint 310. The suitable building footprint 310 of FIG. 3A as depicted is of a different size and different location than the suitable building footprint 310 of FIG. 3B. These two different suitable building footprints represent two different building layouts.

While the examples shown in FIGS. 3A and 3B depict a suitable building footprint 310 being placed in a non-adjacent location separate and apart from the pre-existing footprint perimeter 306, the suitable building footprint 310 may also be placed adjacent to a pre-existing footprint perimeter 306. The system 100 allows for the creation of attached building structures to existing building structures. For example, a user may want to extend a house with an additional bedroom or living room. The system 100 will determine available space next to the house and display building envelopes adjacent to the house identifying locations where additional structures may be placed. The user may then select a suitable building layout representing a desired extension module to be attached to the house.

Figure 4:
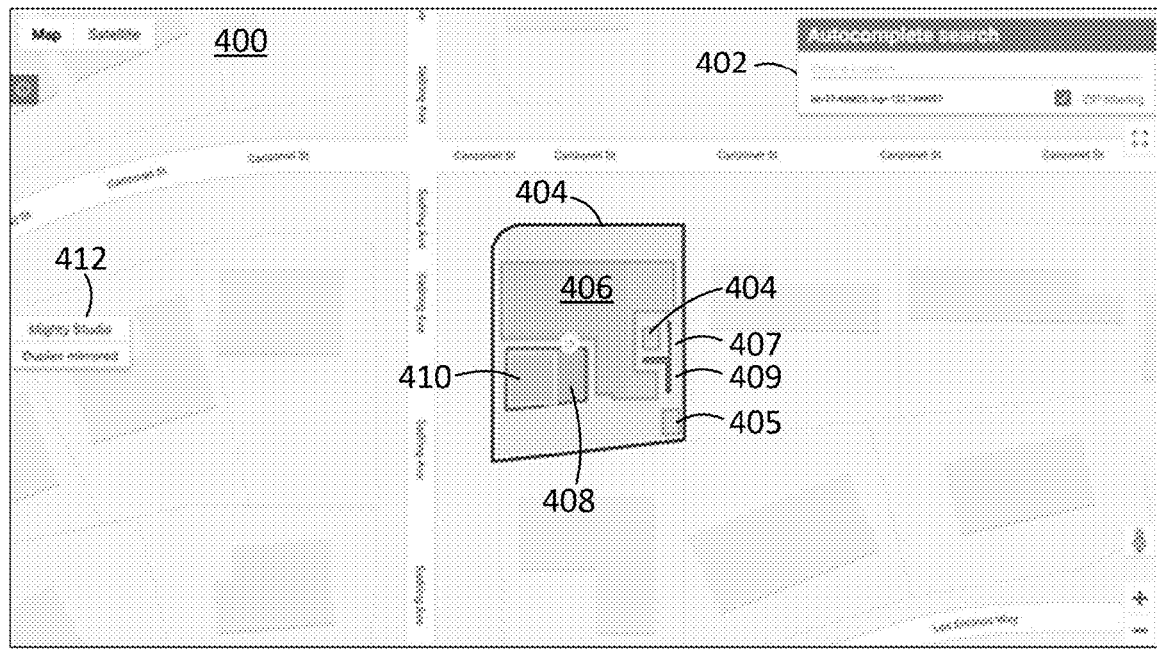
FIG. 4 illustrates an example user interface of the computer system.

Referring now to FIG. 4, an exemplary user interface 400 of system 100 is illustrated with property boundary 404, pre-existing footprints 405, 406, building envelopes 407, 408, 409, pre-determined building layout 410, user input affordance 402, and suitable building layout selection list 412. This figure is used to illustrate how the system 100 determines which building envelopes are of a sufficient size to allow placement of pre-determined sized building layouts.

A building envelope sorting module 112 of system 100 determines the smallest to largest of the building envelopes by sorting building envelope polygons from the smallest sized building envelope polygon to the largest sized building envelope polygon.

As previously discussed, the building envelope determination module generates the available building envelopes for a property. In the case where only one building envelope has been generated, then the system 100 would forgo the process of sorting of the building envelopes.

After the building envelope polygons are sorted, a suitable building envelope determination module 106 of system 100 identifies one or more of the building envelopes where a smallest pre-determined building layout might be placed. In some cases, some building envelopes may be too small in size to fit a pre-determined building layout. For example, building envelope 407 has too small of an area to install or place any new structures.

The system 100 may exclude building envelopes where the area of the building envelope is less than a predetermined criteria or threshold. For example, where the area of the building envelope does not meet an area threshold, such as 450 sq. ft. (e.g. building envelope 407). In another example, a building envelope may have an area of 1000 sq. ft. This area of 1000 sq. ft. appears to be a suitable size over the minimum threshold of 450 sq. ft and would adequately fit a pre-determined building layout. However, in this example the dimensions of the building envelope are only 10 ft by 100 ft. The system 100 may set a minimum predetermined width or length for a suitable building envelope. In this example, the minimum width or length may be set to 40 ft, and because the minimum width dimension has not met been met (i.e., a width of 40 ft.), then the building envelope would be too small to build a suitable structure, and would be precluded from being displayed. Various mathematical equations may be used to calculate the width of the polygon shape of a building envelope.

The system 100 identifies which pre-determined building layouts would fit within the respective building envelopes. For example, the sizes of the predetermined building layouts may be 576 sq. ft., 864 sq. ft., 1,008 sq. ft., or 1,152 sq. ft, and the area of the building envelope is 1,100 sq. ft. If a pre-determined building layout fits within the building envelope, then the system 100 identifies the pre-determined building layout as being suitable for the building envelope.

The system 100 also considers whether the width and length of the pre-determined building layout fits within the building envelope.

For example, the system 100 determines if the entire area of the pre-determined building layout polygon fits within the building envelope polygon. If so, then the pre-determined building layout is identified as being suitable to fit within that particular building envelope. This concept is illustrated in FIG. 4 where the polygon of pre-determined building layout 410 exceeds the boundaries of the building envelope 408. So in this case, the pre-determined building layout would be excluded, and would not be considered suitable for the building envelope.

Once the system 100 identifies a list of suitable building layouts for each of the building envelopes, the system 100 updates the list 412 with the list of suitable building layouts. A user may then select one of the suitable building layouts from the list, and a corresponding suitable building footprint would be displayed, via the user interface 400, in the respective building envelope.

As noted earlier, in this example, the building envelope is large enough to build up to a 1,100 sq. ft. structure. In one embodiment, the system 100 provides a user interface where the user may further tailor a suitable building layout thereby increasing the size of the suitable building layout, and yet remain within the area of the building envelope. The system 100 provides functionality to extend a selected building layout and increase the overall area of the building layout up to the maximum building envelope area.

Figure 8:
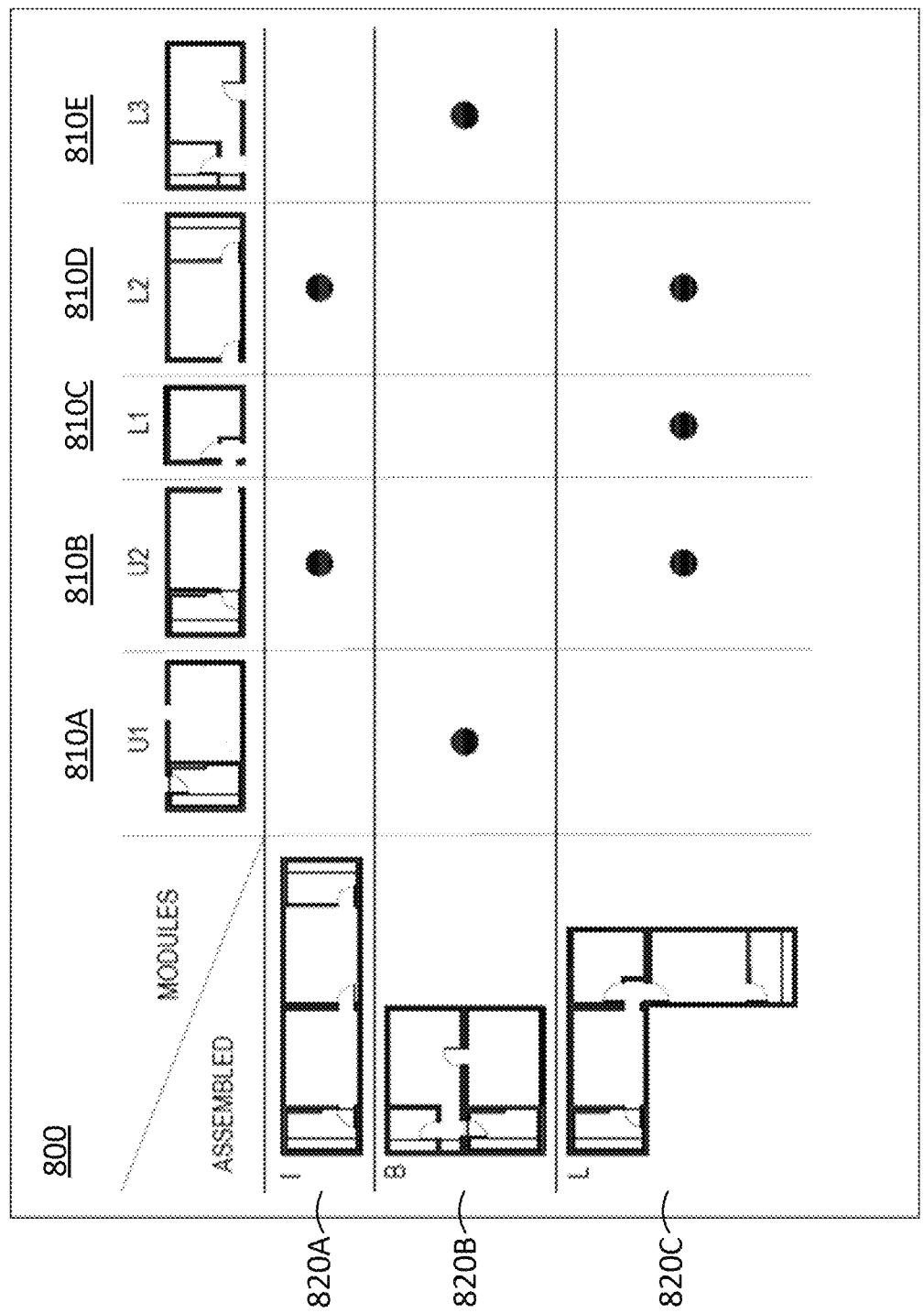
FIG. 8 illustrates example building modules for forming a building layout.

For example, referring to FIG. 8, building layouts in row 820A at 538 sq. ft., 820B at 536 sq. ft., and 820C at 675 sq. ft. would be suitable for the building envelope of 1,110 sq. ft. The system 100 initially selects a basic configuration of a building layout as depicted in row 820C (which includes four building modules shown as selected in columns 810A, 810B, 810C) and has a total area of 1,008 sq. ft. The system 100 then identifies if any of these building modules might be extended. In this example, the bedroom and living modules might be extended. The system 100 asks whether space should be added to one of the rooms. The system 100 receives confirmation as to which of the rooms are to be extended. If the building layout is to be extended, then the system 100 adds an extension to the respective selected rooms thereby increasing the overall area of the building layout. The interface may allow the user to select a specific width, length or square footage amount to increase and/or automatically increase the building layout to the available square footage of the building envelope (e.g. up to 1,100 sq. ft.)

Figure 5:
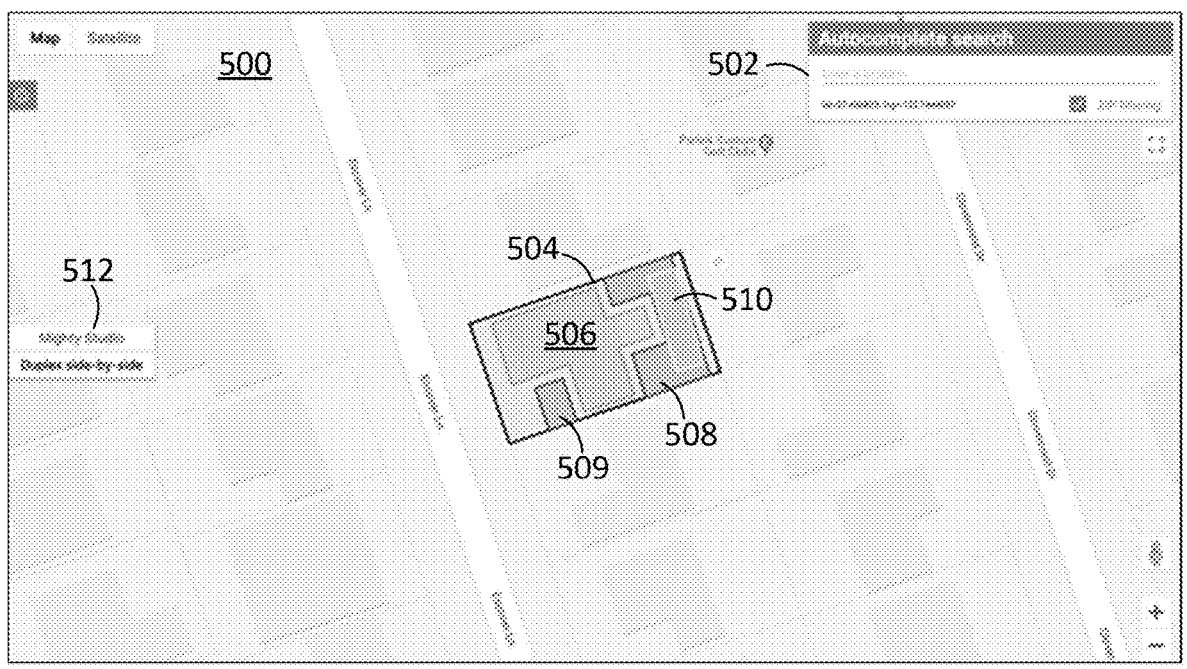
FIG. 5 illustrates an example user interface of the computer system.

Referring to FIG. 5, an exemplary user interface 500 of system 100 is illustrated with property boundary 504, pre-existing footprints 506, building envelopes 508, 509, suitable building footprint 510, user input affordance 502, and suitable building layout selection list 512. Multiple noncontiguous building envelopes 508, 509 are displayed. The user interface 500, may receive a selection of one of the building envelopes 508, 509, and the system 100 updates the list 512 to include only those suitable building layouts that would fit within the selected building envelope. For example, there may be a first building envelope 508 that is very large in size, and a second building envelope 509 that is smaller in size. The larger sized building envelope 508 may adequately fit many different suitable building layouts, whereas the smaller sized building envelope 509 my only fit a couple of different suitable building layouts.

Additionally, a user may interact, via the user interface 500, with a suitable building footprint 510 and select a different building envelope on which to reposition the suitable building footprint. For example, the system 100 may allow repositioning, via the user interface 500, of a suitable building footprint 510 from a first building envelope 508 to a second building envelope 509 by dragging and dropping the suitable building footprint from the first building envelope 508 to the second building envelope 509. Alternatively, the user may select, via the user interface 500, the second building envelope 509 and the suitable building footprint 510 is automatically positioned from the first building envelope 508 to the second building envelope 509.

However, it should be noted, in this example, that in some instances the second building envelope 509 may be too small in size or area to allow repositioning of the suitable building footprint 510 to the second building envelope 509. In such a case, the system 100 would not allow repositioning of the suitable building footprint 510 to building envelope 509. The system may, however, suggest a smaller suitable building footprint that would be small enough in size for the second building envelope 509.

The system 100 may operate in a mode where one or more suitable building footprints may be placed within multiple building envelopes. For example, a suitable building footprint may be placed on both building envelopes 508, 509. This instance is where a user may desire to install two or more separate new buildings within a building envelope. The suitable building footprints would be subject to the size constraints of the respective building envelopes. Additionally, the system 100, may evaluate the zoning data to determine whether multiple additional building footprints are even allowed. If multiple additional building footprints are not allowed, then the system 100 would preclude placement of multiple suitable building footprints.

Figure 6:
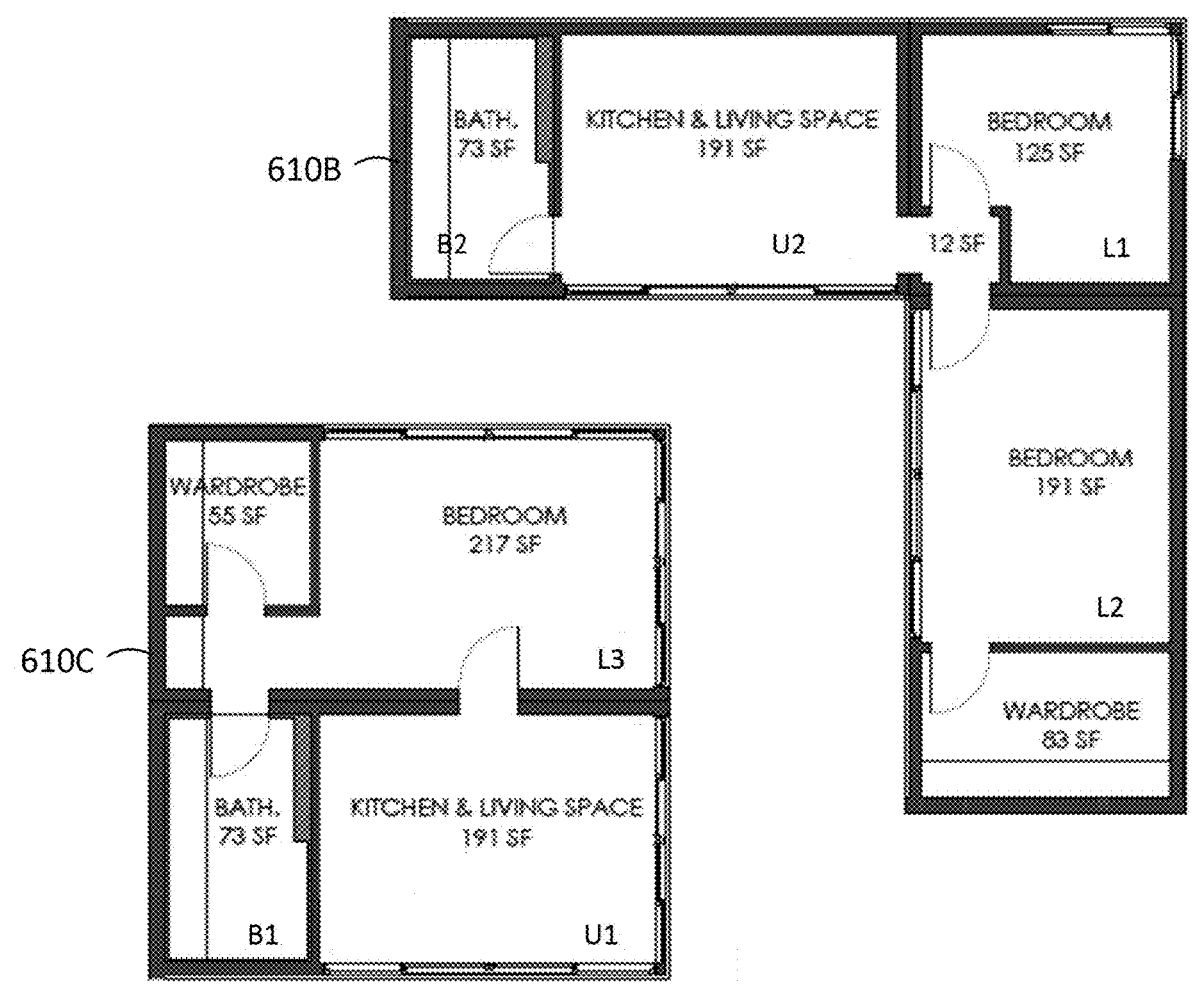
FIG. 6 illustrates example building layouts generated by the computer system.

Now referring to FIG. 6, an exemplary user interface 600 of system 100 is illustrated. The system 100 generates user interface 600 and displays one or more suitable building layouts based on a chosen suitable building footprint. For example, the user interface 300 of FIG. 3 may display the user interface 600 when a user double clicks with a mouse input device on a suitable building footprint 310, or via some other method (e.g., a menu selection). In this example, the user interface 600 depicts three possible building layouts 610A, 610B and 610C that are available for the previously selected suitable building footprint.

Building layout 610A is an I-shaped structure with a total of 538 square feet. Building layout 610A includes a 73 sq. ft. bathroom, a 191 sq. ft. kitchen & living space, and a 191 sq. ft. bedroom with a wardrobe space of 83 sq. ft.

Building layout 610B is an L-shaped structure a total of 675 square feet. Building layout 610B includes a 73 sq. ft. bathroom, a 191 sq. ft. kitchen & living space, a 125 sq. ft. bedroom, and a 191 sq. ft. bedroom with a wardrobe space of 83 sq. ft.

Building layout 610C is a B-shaped structure with a total of 536 square feet. Building layout 610C includes a 73 sq. ft. bathroom, a 191 sq. ft kitchen & living space, and a 217 sq. ft. bedroom with a wardrobe space of 55 sq. ft.

The system 100 receives a selection of one of the generated building layouts 610A, 610B, 610C. The system 100 receives a selection or confirmation for a suitable building layout. Based on a selected suitable building layout (as described in this disclosure), the system 100 may create a request or order and transmit the request or order to a manufacturer providing 3D printing instructions for the selected suitable building layout. Additionally, the system 100 may generate one or more electronic reports and transmit the report(s) (e.g., a permitting document package) to various recipients (e.g., to planning department officials) via electronic communication (e.g., electronic mail). The specific information included in the report may be based on an electronic template which identifies the required information that may be required a governmental municipality (e.g., city, township, county, etc.) The electronic reports may include the selected a description of building modules for the selected suitable building layout. Each building module has a pre-defined specification and requirements which may be included in the generated permitting document package, including building module connection types, required foundation type, utility requirements, and connections between building modules.

Also, the system 100 may generate instructions to print the suitable building layout and/or modules that form the suitable building layout. For example, a suitable building layout (and its component building modules) might be produced using a Large Scale Additive Manufacturing method such as 3D printing in an automated production line where successive layers of materials are laid down in a manner to create different structures. The size of a component building module may be limited to the maximum printable area of the 3D printer. For off-site manufacturing, the maximum size of a printed structure might also be restricted to the limitations of transportation capabilities.

The system 100 may generate an electronic package of one or more electronical files for transmission to one or more 3D printers for printing of the structures. The system 100 may create files for a completed building layout and/or individual building modules of a building layout. For example, the system 100 may create files in a format used for 3D printing (e.g., .obj files (very common format for 3D printing), .STL files (STereoLithography), .gcode for G-code data files, VRML (Virtual Reality Modelling Language) files, .3MF files (an XML-based format used by Microsoft), .X3G files (a proprietary format used by Makerbot), .AMF files (Additive Manufacturing File Format—an XLM-based open standard format), .FBX files (used by Autodesk), and/or .PLY files (Polygon File Format)).

Figure 7:
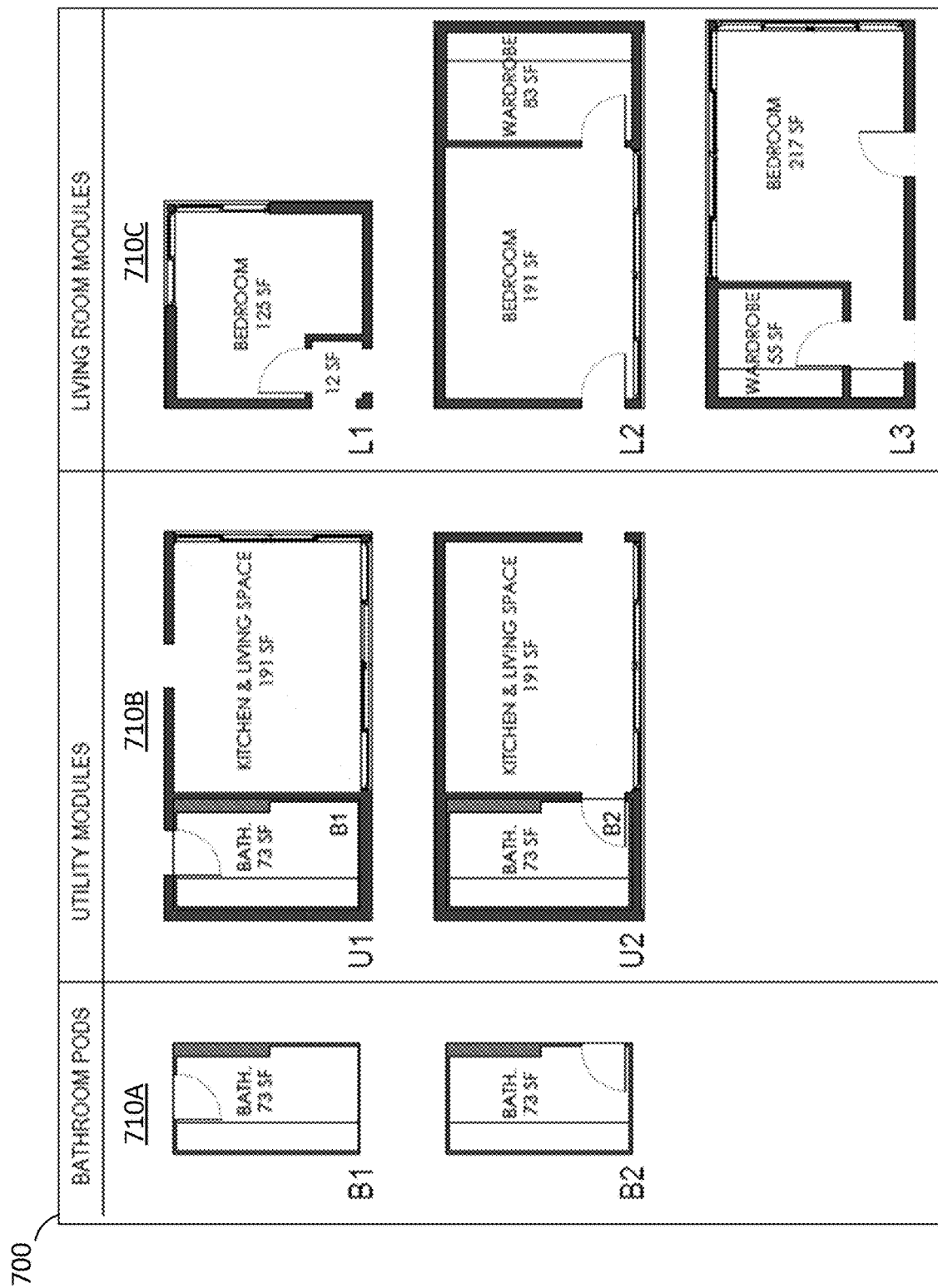
FIG. 7 illustrates example building modules for forming a building layout.

Referring now to FIG. 7, the illustration depicts examples 700 of building modules B1, B2, U1, U2, L1, L2 and L3. These building modules may be combined together to form a building layout. Three different building modules groupings 710A, 710B, 710C are shown that may be combined together. The first grouping 710A includes bathroom modules B1 and B2. The first bathroom module B1 is a bathroom module sized at 73 sq. ft. with a door shown at the top of the module. The second bathroom module B2 is a bathroom module with the sized at 73 sq. ft. with a door shown at the lower right of the module.

The second grouping 710B includes two utility modules U1 and U2. The first utility module U1 includes a bathroom (using bathroom module B1) and kitchen and living space area sized at 191 sq. ft. The second utility module U2 includes a bathroom (using bathroom module B2) and kitchen and living space area sized at 191 sq. ft.

The third grouping 710C includes three living room modules L1, L2 and L3. The first living room module L1 includes a bedroom sized at 125 sq. ft. The second living room module L2 includes a bedroom sized at 191 sq. ft. and a wardrobe area sized at 83 sq. ft. The third living room module L3 includes a bedroom sized at 217 sq. ft. and a wardrobe area sized at 55 sq. ft.

Referring now to FIG. 8, the illustration depicts examples 800 of how the building modules of FIG. 7 may be combined. The system 100, via a suitable layout construction module 110, may automatically configure building modules into the respective suitable building layouts based on received user requirements indicating what type of building attributes are desired. For example, system 100 may request how many bedrooms are needed, whether bathrooms are needed, whether a kitchen is needed, whether a dining room is needed, etc. Based on a user's confirmation of the attributes of a new building, the system 100 then may assemble the building modules together to form one or more building layouts that would fit within one of the property's building envelopes.

The modules U1, U2, L1, L2 and L3 depicted in FIG. 8 correspond to the module U1, U2, L1, L2 and L3 of FIG. 7. Rows 820A, 820B, 820C show various examples of how the different modules in columns 810A, 810B, 810C, 810D, 810E may be combined together to form a building layout. The shaded circle in one of the building module columns 810A, 810B, 810C, 810D, 810 indicates for a respective row a selected building module to include in the assembled building layout. For example, combined building modules of row 820A include the module U2 of column 810B and the module L2 of column 810D. Combined building modules of row 820B include the module U1 of column 810A and the module L3 of column 810E. Combined building modules of row 820C include the module U2 of column 810B, module L1 of column 810C and module L3 of 810D.

Figure 10:
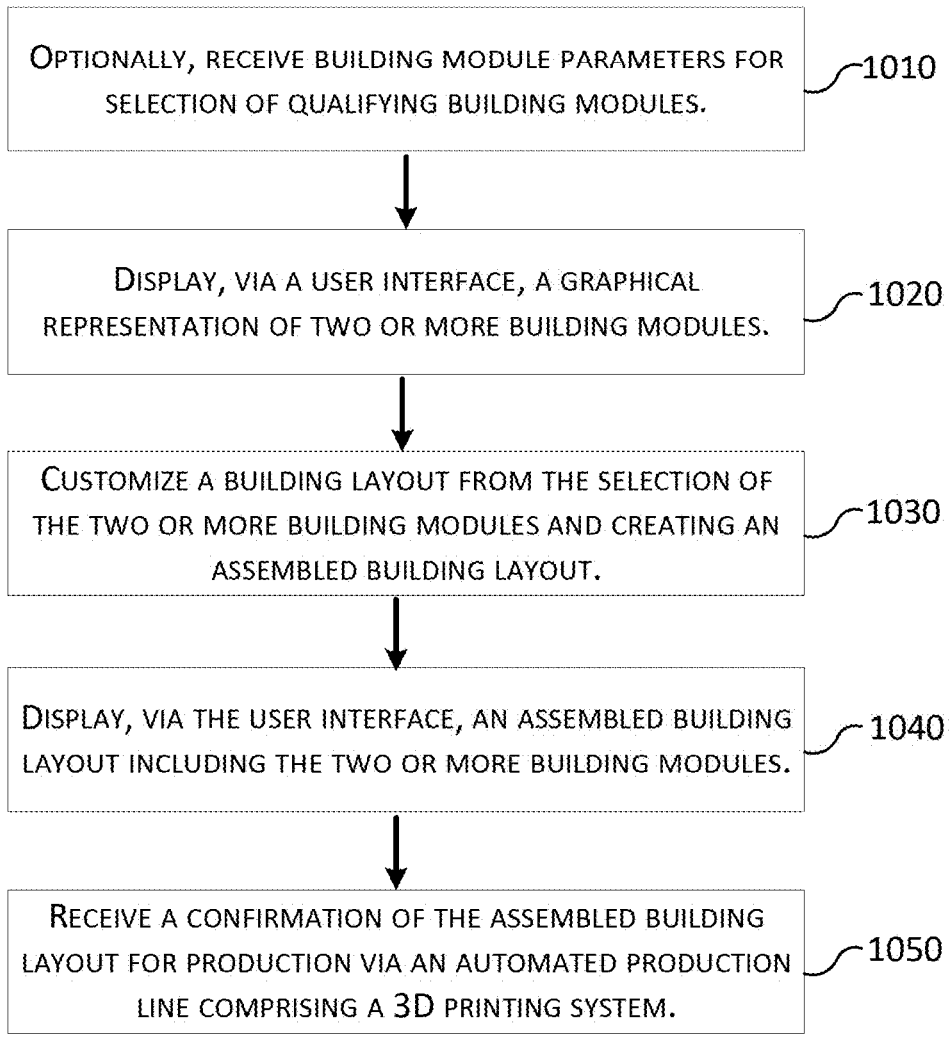
FIG. 10 illustrates a flowchart of an example process for customizing a building layout for production via an automated production line comprising a 3D printing system.

FIG. 10 illustrates a flowchart of an example process for customizing a building layout for an automated production line comprising a 3D printing system. The system 100 provides for the selection and customization of different building layouts to create a suitable building layout for an automated production line comprising a 3D printing system. The system 100 provides a user interface and functionality that allows a user to select among different building modules, such as those described in reference to FIGS. 7 and 8, to form a building layout where each of the building modules forming the building layout would be 3D printed via an automated production line having a 3D printing system and then later assembled. The 3D printed building module may go through other post-processing steps such as pouring foam for insulation, finishing exterior and interior surfaces. A building module represents a building structure that may be 3D printed and assembled together with another 3D printed building structure of another building module. A building layout may be customized by the selection of two or more building modules thereby creating an assembled building layout. The assembled building layout includes those building modules that are of a configuration that may be physically assembled together after the respective building modules have been 3D printed.

The system 100 may optionally select a set of building modules for presentation, via a user interface, to a user based on user-defined requirements (1010). For example, the system 100 may receive user input defining parameters for the overall dimension of an assembled building such as width and length, total square feet, etc. Also, the system 100 may receive user input defining the particular parameters for an individual building module. Based on the user-defined requirements, the system 100 may retrieve and present to the user those particular building modules that qualify or meet the user's requirements. For example, if the overall building footprint must fit within a 30-foot by 30-foot square area, then the system 100 would preclude and not present to the user those building modules that exceed 30 ft in its length or width.

This functionality allows a user to customize the size and shape of the individual building modules (e.g., a bathroom, living room, bedroom, utility room, garage, dining room, kitchen, storage room, etc.) for the assembled building layout. For example, the system 100 may receive a user input for desired dimensions of a living room and bedroom. Based on the desired dimensions, the system 100 may retrieve and present to the user, via the user interface, those particular building modules that qualify or meet the user's requirements. In this case, the system 100 would only present living room and bedroom modules that meet the dimensional requirements as set by the user.

Also, the system 100 may allow further customization by allowing the user to select the building module categories that the user desires to have included in assembled building layout. The building module categories are different types of rooms are structures that may be combined together, such as a bathroom, living room, bedroom, game room, utility room, garage, dining room, kitchen, and/or a storage room. The system 100 may present to the user a listing and/or a graphical representation of the different categories of the building module types. In some instances, only one building module may be selected for each category. In other instances, one or more building modules may be selected from each category.

A user may select one or more different categories of the building module types that the user desires to be included in the assembled building layout. For example, the user may want to create a customized 3D building having only a bathroom, utility room and a living room. The system 100 would receive a selection from the user of the different building module types. In response to the selected types, the system 100 would present, via the user interface, building modules associated with the three different selected building module types. This allows the user to pick and choose and combine together bathroom building modules, utility room building modules, and living room building modules. In other words, the user may easily customize and assemble together those building module types of interest to the user.

Moreover, the system 100 may also present to the user, via the user interface, graphical representations of one or more assembled building layouts that include the desired categories of the building module types. For example, the system 100 may present a few different configurations for assembled building layouts having a bathroom, utility room and a living room. The user then may select one of the assembled building layouts for 3D printing.

The system 100 may display a user interface depicting a graphical representation of one or more building modules (1020). Building modules that form an assembled building layout are later 3D printed. The 3D printed building modules form components which are physically assembled together to build a building structure. In some instances, the selected building modules may only be assembled together in one configuration. In other instances, the selected building modules may be assembled together to form multiple configurations for a building layout.

The user interface receives a selection of one or more of the building modules. For example, a user interface may present the examples 700 building modules of FIG. 7. The user interface may receive a selection of one or more of the building modules (1030). For example, a user may select one module from each of the three different building modules groupings 710A, 710B, 710C. In one embodiment, each of the modules in a particular grouping are alternatives to each other. For example, for the bathroom grouping 710A, a user may select only one module from the group, such as B1 or B2. In other embodiments, multiple modules from the same building module grouping may be selected together. The building modules graphically describe and/or represent layouts of physical 3D printed structures that can be joined together and assembled to from a real-world structure, such as a house or other physical building.

The system 100 may assemble and display in real-time the selected building modules showing what the completed building would look like. For example, the system may display, via the interface, a view of an assembled building layout depicting each of the selected building modules placed together to form a single building structure (1040). This functionality allows the user to customize the assembled building layout in real-time and see what different combinations of building modules would look like together.

While customizing the assembled building layout the user may select from different building modules. However, in some cases a selection of one building module of one type may preclude the selection of a building module of another type. This may be due to the particular configuration of the first selected building module type. For example, a building module may have a pre-defined placement of doors, windows or other structures. Other building modules may not be combinable with the first select building module. In such a case, the system may indicate that other building modules as being non-selectable. For example, assume that two bedroom building modules and three living room building modules are presented via a user interface for selection by a user. All five of the presented building modules would initially be indicated as selectable. However, if a user selects a first bedroom module, then assume that the second living room building module is not compatible with the first bedroom building module. In other words, the second living room building module and the first bedroom building module may not be combined together to form an assembled building layout. For example, the reason the two building modules may not be combinable could be due to building module size differences, door or window placement or other factors.

In this case, after the user selects the first bedroom building module, the system 100 would indicate that the second living room module is not selectable (e.g., by graying out, de-emphasis, de-highlighting, or via some other graphical indication above or about the second living room module). Likewise, before any building module is selected, if the user selects the second living room building module first, then the first bedroom module would become non-selectable.

The system 100 may include a building module compatibility table or database which the system 100 uses to determine which building modules are configurable with other building modules. For example, the system 100 may evaluate if a first building module is selected, then which other building modules are compatible with the first building module. For those incompatible building modules, the system may indicate that they are not selectable. The compatibility of building modules may be based on whether the selected building modules may be assembled together when 3D printed.

In certain instances, due to the shape or configuration of a particular building module, the building module may not be combinable with another building module. A building module compatibility table or database may store information indicating which other building modules a particular building module is or is not compatible with to form an assembled physical structure. This allows the system 100 to enforce which building modules are selectable and/or combinable together to form an assembled building layout.

Also, the system 100 may enforce that for each of the selected building modules they must be compatible together to form a complete building structure where each of the 3D printed building modules may be assembled together. The system 100 may use a compatibility determination engine or use a set of predefined rules to assess whether different building modules may be combined. For example, the system 100 may assess whether lengths or widths of different building modules are equal with one another. If not the system 100 may not allow the selection of non-equal length or width building modules to be combined. The system 100 may also determine whether two different building modules have openings, such as doors or windows, that would not be compatible with two building modules.

In one embodiment, the building modules may have pre-defined locations about a building module where interconnecting structures are 3D printed. The inter-connecting structures allow for the assembly of the individual 3D printed structures for each of the separate selected building modules that form an assembled building layout. For example, a 3D printed structure associated with a building module may have lips, slots, joints, protrusions, recesses, fingers, etc. that allow for two separate 3D printed building modules to be aligned, joined and fastened together. For each building module, the inter-connecting structures may be printed at pre-determined locations about the building module such that when the building module is 3D printed, the printed structure may be mated with another 3D printed structure at the inter-connecting structure locations. For example, the walls of the 3D printed building structures may be aligned and placed together. An epoxy or some other adherent may be used to help seal the joints of the walls. The walls may have multiple inter-connecting structures where a screw and screw nuts may be placed to secure the walls of adjoining building structures together. In the case of a building module having pre-defined locations of inter-connecting structures, this may preclude two building modules from being combined where the pre-defined locations do not match between the two building modules. In this case, the system 100 may not allow the combination of the two building modules.

In another embodiment, the system 100 may dynamically determine the placement of the inter-connecting structures about the building modules after the building modules are assembled together. The system 100 determines and dynamically places inter-connecting structures for the buildings modules, which are then subsequently formed in the respective 3D printed structures. This allows for greater flexibility in the customization of the building modules in that the system 100 determines the placement of inter-connecting structures about the selected building modules after an assembled building layout is created.

The system 100 may present building modules of having predefined sizes or dimensions such that the building module would be 3D printed in those predefined sizes or dimensions. For example, a pre-determined size of a bedroom building module may be 20 f×15 ft. The system 100 may allow for scaling or resizing any of predefined sizes or dimensions of building modules. The system 100 may also maintain the same presented shape of the building module while it is being resized. An increase in the size of the building module may cause a corresponding increase in the size of the building module to be 3D printed. A decrease in the size of the building module may cause a corresponding decrease in the size of a building module being 3D printed. A resized building module may then be used by the system 100 as one of the building modules for the assembled building layout to be 3D printed.

The system 100 may have predetermined maximum and minimum size changes that are allowed are disallowed for resizing a building module. For example, a building module's dimensions may be reduced in size only to a particular dimensional size before the building module is not functional. Also, the system 100 may dynamically add or remove windows or doors about the building modules when the building module is resized.

Likewise, an assembled building layout may also be scaled or resized to change the overall dimensions of the assembled building layout. The user interface may receive selections about a graphical representation of the assembled building layout. This allows the user to resize or reshape the assembled building layout. Thus, allowing the user to easily change the overall dimensions of a 3D printed structure.

The system 100 may present predefined building modules where the building modules have a preset location for windows and doors. For an added degree of customization, the building modules may be presented without door or window placement. A user may combine different building modules to form an assembled building layout. After the building layout is formed, the system 100 may receive selections for custom placement of doors and/or windows about the building layout. This allows a user to select where they would like to have doors or windows placed about a building.

In another mode, the system 100 may dynamically place doors and/or windows about the building layout. For example, the system 100 may place doors or windows about the building layout based on the overall assembled configuration. The system 100 may automatically place the doors or windows in an ideal location about the individual building modules. For example, the system 100 may automatically place a window on each side of a corner of adjoining walls. Other structures may also be customized and placed on the building modules, such as electric outlets, wall insets, etc.

The system 100 may automatically generate files in a format used for 3D printing (as previously described) with instructions to print the respective customized building modules including the user customized and/or system dynamic placement of doors, windows or other structures.

In another mode, the system 100 may present a user interface depicting a graphical interface such as that shown in FIG. 8. The example chart shows assembled building layouts 820A, 820B and 820C and the respective building modules 810A, 810B, 810C, 810D and 810E that form the building modules as indicated by the circle in a respective row and column. For example, assembled building layout 820B includes building modules 810A and 810E. A user may select one of the assembled building layouts for 3D printing.

Similar to the customization of individual building modules as described above, the system 100 may provide for customization of a pre-determined assembled building layout. The system 100 may receive selection for the placement, or dynamically place windows, doors or other structures about the assembled building layout. Additionally, an assembled building layout may be resized or scaled to adjust the overall dimensions of the building modules that are part of the assembled building layout. The adjusted building layout may then be 3D printed with the individual building modules being 3D printed according to the adjusts to the building layout.

The system 100 may receive a confirmation of the assembled building layout for 3D printing (1050). The user interface may present a graphical user affordance, such as a button or checkbox, allowing the user to confirm the assembled building layout for 3D printing. After the building layout is confirmed, the individual building modules may be 3D printed, transported to a location and the individual building modules assembled.

The building module may be 3D printed via an automated production line with a 3D printing system and then assembled together to form an actual physical building structure. Additionally, other machinery may be used to complete the fabrication of the physical building structure, such as trimming and painting stations. The building structures include a roof, floor, walls, windows and doorways. The 3D printed modules may either be assembled together in whole are in part to form a building structure. The partly or completely assembled building structures may be transported to the respective property where the building structures will be installed. For example, building structures may be connected to building structure, and building structure may be connected to building structure. These preassembled building structures may then be transported and assembled together at the property to form a completed livable building.

Fasteners or assembly mechanism may be used to join the building structures together. The walls of the building structures are aligned and placed together. An epoxy or some other adherent may be used to help seal the joints of the walls. The walls have multiple connection points where a screw and screw nuts may be placed to secure the walls of adjoining building structures together.

Figure 9:
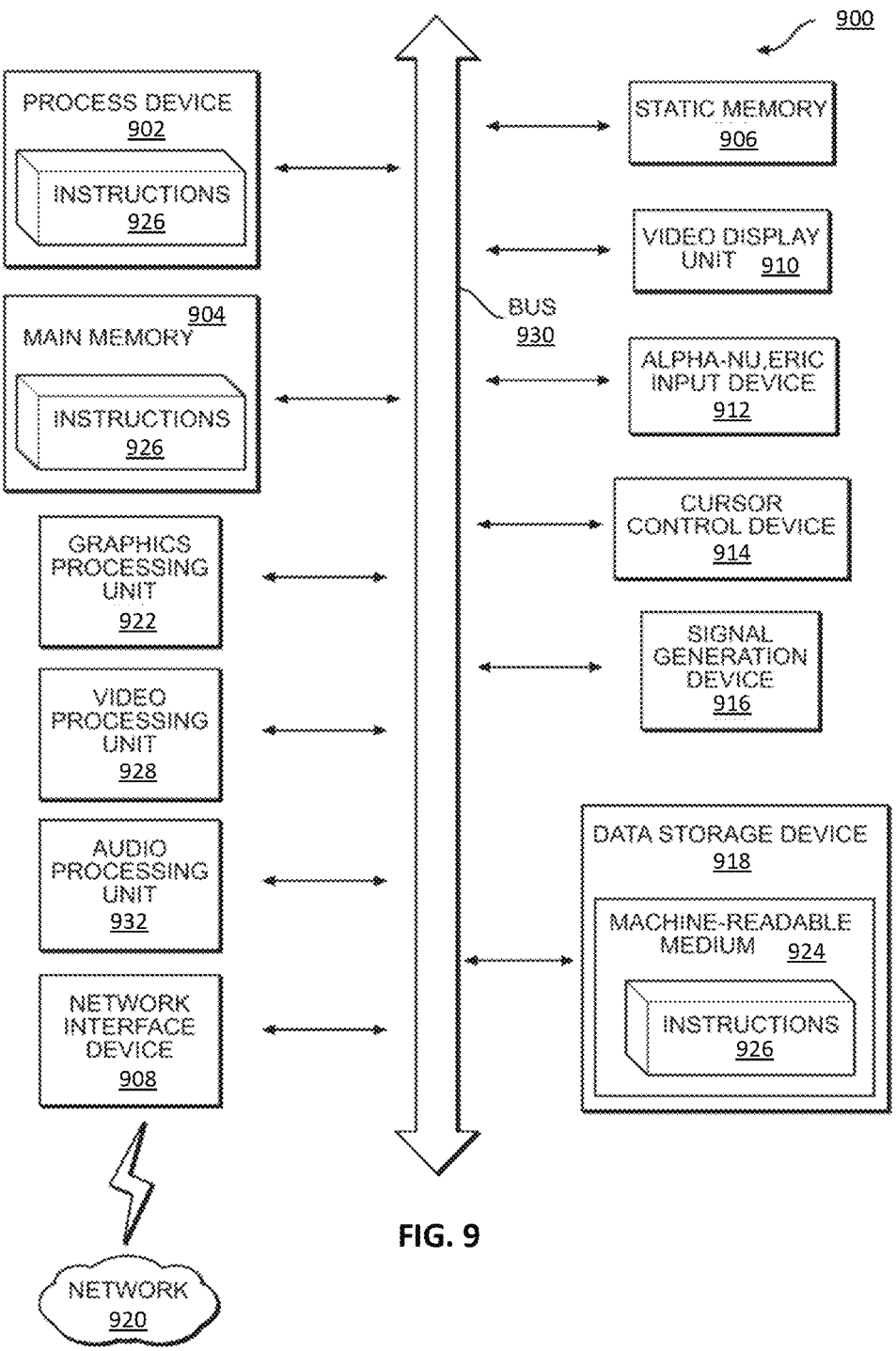
FIG. 9 illustrates an example machine of the computer system.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:
    displaying, via a user interface, a graphical representation of two or more building modules, wherein a building module represents a building structure that may be 3D printed and assembled together with another 3D printed building structure of another building module, wherein the user interface displays at least two building modules of a first building module category in a first portion of the user interface, and displays at least two building modules of a second building module category in a second portion of the user interface;
    customizing a building layout from a user selection, via the user interface, of one building module from the displayed buildings modules of the first building module category and one building module from the displayed building modules of the second building module category and creating an assembled building layout, wherein the assembled building layout includes those building modules that are of a configuration that may be physically assembled together after the respective building modules have been 3D printed;
    displaying, via the user interface, the assembled building layout including the selected two or more building modules; and
    receiving a confirmation of the assembled building layout for production via an automated production line comprising a 3D printing system.

2. The system of claim 1, wherein customizing a building layout comprises:
    receiving a user selection of the two or more building modules to be included in the building layout.

3. The system of claim 1, wherein the two or more building modules are selectable from building module categories, and only one building module may be selected for each category.

4. The system of claim 1, wherein the two or more building modules are selectable from building module categories, and two or more building modules may be selected for each category.

5. The system of claim 1, wherein the building modules are associated with a building module category of a bathroom type, utility room type, and living room type.

6. The system of claim 5, wherein the user interface provides a grouping of selectable building modules from at least one of the building module categories.

7. The system of claim 5, wherein a particular building module of a building module category may only be combined with a particular building module of another building module category.

8. The system of claim 1, further comprising the operations of:
    determining dimensional requirements of an area for a proposed building layout; and
    displaying only those building modules, via the user interface, that when combined would fit within the dimensional requirements of the area for the proposed building layout.

9. The system of claim 1, further comprising the operations of:
    precluding, via the user interface, the selection of one of the building modules of the second building module category based on the user selection of the building module from the first building module category.

10. A method implemented by a system comprising one or more processors, the method comprising:
    displaying, via a user interface, a graphical representation of two or more building modules, wherein a building module represents a building structure that may be 3D printed and assembled together with another 3D printed building structure of another building module, wherein the user interface displays at least two building modules of a first building module category in a first portion of the user interface, and displays at least two building modules of a second building module category in a second portion of the user interface;
    customizing a building layout from a user selection, via the user interface, of one building module from the displayed buildings modules of the first building module category and one building module from the displayed building modules of the second building module category and creating an assembled building layout, wherein the assembled building layout includes those building modules that are of a configuration that may be physically assembled together after the respective building modules have been 3D printed;
    displaying, via the user interface, the assembled building layout including the selected two or more building modules; and
    receiving a confirmation of the assembled building layout for production via an automated production line comprising a 3D printing system.

11. The method of claim 10, wherein customizing a building layout comprises:
    receiving a user selection of the two or more building modules to be included in the building layout.

12. The method of claim 10, wherein the two or more building modules are selectable from building module categories, and only one building module may be selected for each category.

13. The method of claim 10, wherein the two or more building modules are selectable from building module categories, and two or more building modules may be selected for each category.

14. The method of claim 10, wherein the building modules are associated with a building module category of a bathroom type, utility room type, and living room type.

15. The method of claim 14, wherein the user interface provides a grouping of selectable building modules from at least one of the building module categories.

16. The method of claim 14, wherein a particular building module of a building module category may only be combined with a particular building module of another building module category.

17. The method of claim 10, the method further comprising:

determining dimensional requirements of an area for a proposed building layout; and displaying only those building modules, via the user interface, that when combined would fit within the dimensional requirements of the area for the proposed building layout.

18. The method of claim 10, the method further comprising:

precluding, via the user interface, the selection of one of the building modules of the second building module category based on the user selection of the building module from the first building module category.

19. A non-transitory computer storage medium comprising instructions that when executed by a system comprising one or more processors, cause the one or more processors to perform operations comprising:

displaying, via a user interface, a graphical representation of two or more building modules, wherein a building module represents a building structure that may be 3D printed and assembled together with another 3D printed building structure of another building module, wherein the user interface displays at least two building modules of a first building module category in a first portion of the user interface, and displays at least two building modules of a second building module category in a second portion of the user interface;

customizing a building layout from a user selection, via the user interface, of one building module from the displayed buildings modules of the first building module category and one building module from the displayed building modules of the second building module category and creating an assembled building layout, wherein the assembled building layout includes those building modules that are of a configuration that may be physically assembled together after the respective building modules have been 3D printed;

displaying, via the user interface, the assembled building layout including the two or more building modules; and receiving a confirmation of the assembled building layout for production via an automated production line comprising a 3D printing system.

20. The non-transitory computer storage medium of claim 19, wherein customizing a building layout comprises:

receiving a user selection of the two or more building modules to be included in the building layout.

21. The non-transitory computer storage medium of claim 19, wherein the two or more building modules are selectable from building module categories, and only one building module may be selected for each category.

22. The non-transitory computer storage medium of claim 19, wherein the two or more building modules are selectable from building module categories, and two or more building modules may be selected for each category.

23. The non-transitory computer storage medium of claim 19, wherein the building modules are associated with a building module category of a bathroom type, utility room type, and living room type.

24. The non-transitory computer storage medium of claim 23, wherein the user interface provides a grouping of selectable building modules from at least one of the building module categories.

25. The non-transitory computer storage medium of claim 23, wherein a particular building module of a building module category may only be combined with a particular building module of another building module category.

26. The non-transitory computer storage medium of claim 19, the operations further comprising:

determining dimensional requirements of an area for a proposed building layout; and displaying only those building modules, via the user interface, that when combined would fit within the dimensional requirements of the area for the proposed building layout.

27. The non-transitory computer storage medium of claim 19, the operations further comprising:

precluding, via the user interface, the selection of one of the building modules of the second building module category based on the user selection of the building module from the first building module category.

* * * * *